Dec. 20, 1960 J. A. SHAFER 2,965,045
CAR BODY CENTER PLATE
Filed April 27, 1959 2 Sheets-Sheet 1
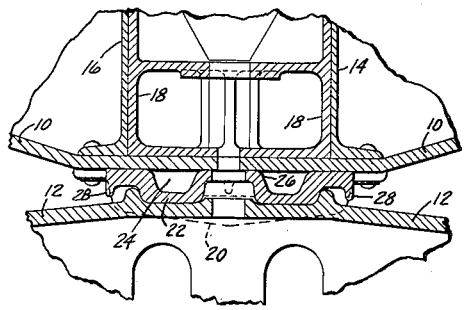
Fig. 1
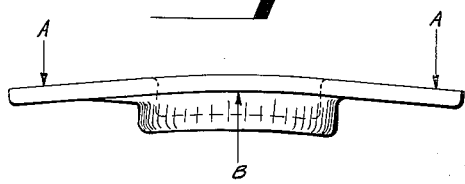
Fig. 2
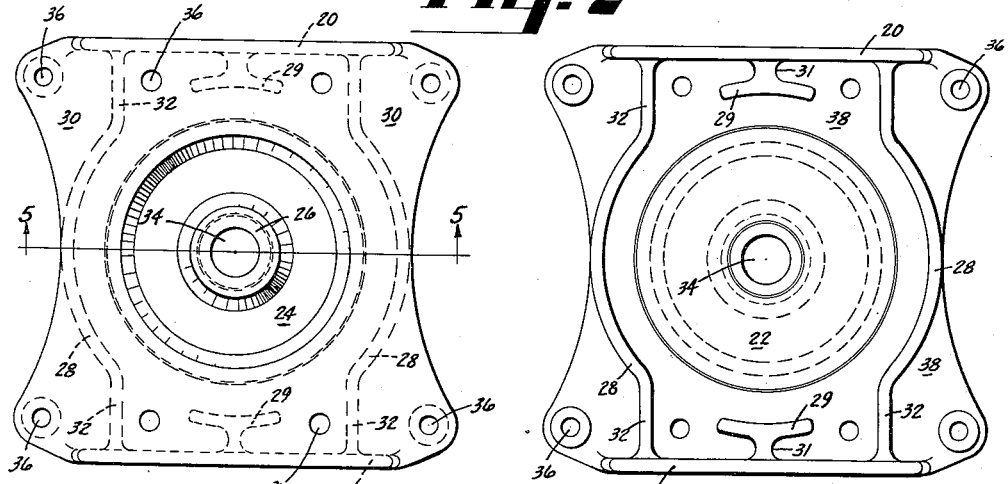
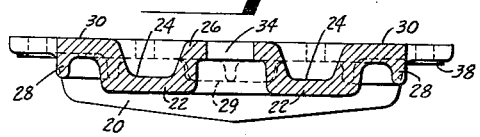
Fig. 5
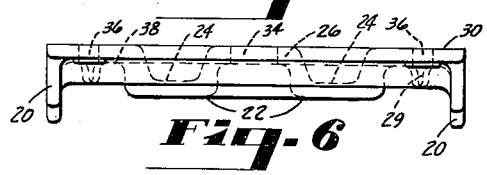
Fig. 6
INVENTOR.
BY JAMES A. SHAFER
Henry Kozak
ATTORNEY Dec. 20, 1960  J. A. SHAFER  2,965,045
CAR BODY CENTER PLATE
Filed April 27, 1959  2 Sheets-Sheet 2
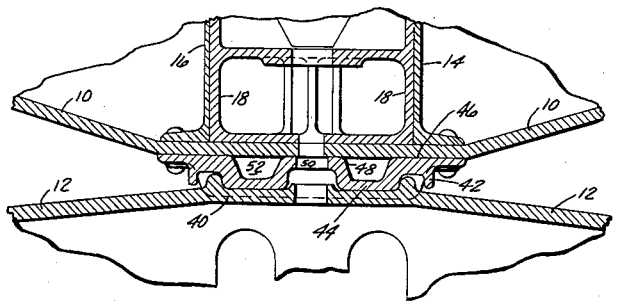
*Fig. 7*
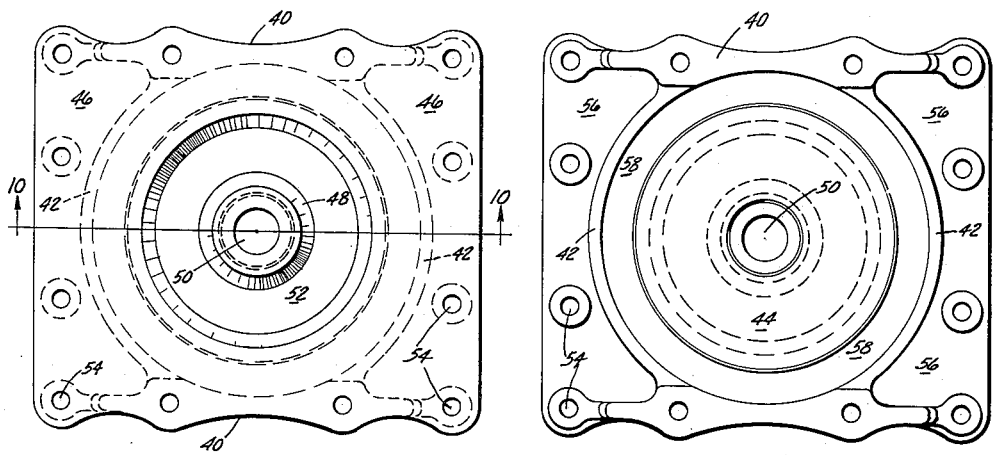
*Fig. 8*  *Fig. 9*
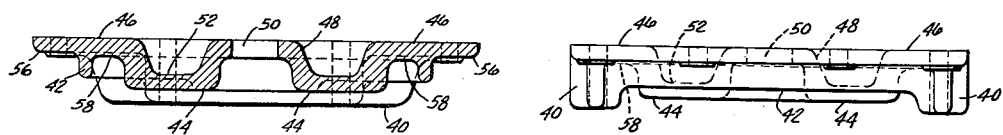
*Fig. 10*  *Fig. 11*
INVENTOR.
BY JAMES A. SHAFER
Henry Kozak
ATTORNEY United States Patent Office 2,965,045
Patented Dec. 20, 1960

2,965,045

CAR BODY CENTER PLATE

James A. Shafer, East Cleveland, Ohio, assignor to National Malleable and Steel Castings Company, Cleveland, Ohio, a corporation of Ohio Filed Apr. 27, 1959, Ser. No. 808,979

6 Claims. (Cl. 105—199)

This invention relates to improvements in railway car construction, particularly to improvements in the car body center plate which is the plate located between the car body supporting member and the car truck supporting member or bolster. It is the function of the car body center plate to enable the car body to pivot freely in a horizontal plane.

Prior art construction called for a plate, forged or cast, with a single bowl-like depression in the central portion. This mode of construction, with the central depression, reduced the area of the top surface of the plate in contact with the car body supporting member without increasing the strength of the surface still in contact with the supporting member. Service experience with the prior art center plate indicates that it is susceptible to bending stresses which cause fractures at or adjacent the junction of the bowl-like depression with the top surface of the plate.

This invention specifically relates to the construction of a car body center plate having arcuate and straight flanges on one side of the plate to provide reinforcement to those areas subject to excessive fracturing and bending.

It is the primary object of this invention to construct a car body center plate having a plurality of reinforcing flanges so disposed as to enable the center plate to better resist fracturing and bending.

A more specific object is to construct a car body center plate having arcuate and straight flanges on one side of the plate to provide substantial reinforcement for the areas subject to bending and fracturing stresses in the plate, and to provide protection to the central aperture from foreign matter.

Other objects and advantages of the invention will be apparent from the following description and the accompanying drawings:

Figure 1 illustrates in transverse section the novel car body center plate in assembled position between the car body supporting member and the car truck bolster.

Figure 2 is a front view showing the deformation occurring in a conventional center plate as a result of bending forces applied during general service.

Figure 3 is a top plan view of one form of the center plate of this invention.

Figure 4 is a bottom plan view of the same plate illustrated in Fig. 3.

Figure 5 is a sectional view taken along line 5—5 of Fig. 3.

Figure 6 is an end view of the plate illustrated in Fig. 3.

Figure 7 is a transverse section illustrating another form of the center plate in assembled position between the car body supporting member and the car truck bolster.

Figure 8 is a top plan view of the center plate shown in Fig. 7.

Figure 9 is a bottom plan view of the plate illustrated in Fig. 8.

Figure 10 is a transverse section taken along line 10—10 of Fig. 9.

Figure 11 is a side view of the plate illustrated in Fig. 8.

Referring to the drawings, particularly Fig. 1, the novel center plate is disclosed as being disposed between the car body supporting member 10, and the car truck supporting member or bolster 12. The walls 14 and 16 of the center sill of the car are prone to bend the conventional center plate in the manner illustrated in Fig. 2. The center filler casting 18 is disposed between the walls 14 and 16 of the car center sill for the purpose of strengthening the center sill load supporting area. In service, however, it has been discovered that due to the heavy loads carried by the average car, the center filler casting 18 moves upwardly between the walls and the center plate bends as is illustrated by arrow B in Fig. 2. In effect, the heavy loads of the car are concentrated in the walls 14 and 16 of the center sill which bear down on the center plate and tend to bend the plate, as is indicated by arrows A in Fig. 2. This causes the bowl-like depression of the conventional plate to bend upwardly and causes fractures to develop along the periphery of the bowl.

Figs. 3 and 4 are top and bottom plan views, respectively, of the novel center plate wherein there is a depression 24 in the top surface 30 of the plate. A segmented arcuate flange 28 is disposed on the bottom surface 38 of the plate and is so situated as to substantially strengthen the area near the periphery of the depression where fracturing most frequently takes place. On the bottom side of the plate there is a ring-like protuberance 22 which is concentric about the central opening 34. The bottom surface of the protuberance 22 and the top surface 30 of the center plate are the weight bearing surfaces of the center plate.

A downwardly extending straight flange 20 adjacent opposing edges of the center plate is so disposed as to be at right angles to the longitudinal axis of the plate and car body. Flange 20 is tapered so as to have its greatest depth at the point where it intersects the longitudinal axis of the plate, and at all points along its length, exceeds the depth of protuberance 22. Flanges 20 are so aligned as to extend crosswise to the car body center sill, thereby offering maximum resistance against forces tending to bend the plate in the manner illustrated in Fig. 2. Flanges 20 are joined to arcuate flange 28 by means of straight flange portions 32. Also, there are provided arcuately curved flange elements 29 which are spaced from but joined to flanges 20 by portions 31. Flanges 29, 31, and 32 in conjunction with flanges 20 and 28 provide maximum resistance to bending and fracturing forces applied to the plate. Flanges 20 have a greater depth than flanges 28 to offer greater resistance to the bending forces which are concentrated at right angles to the longitudinal axis. Rivet holes 36 are so disposed as to conform to the American Association of Railroads' requirements as to location.

In the center of the depression 24 on the top surface 30 of the center plate is a boss 26 concentric about the central aperture 34. By having the top surface of the boss at the same level as the top surface 30 of the plate, it likewise is in contact with the car body supporting member 10 and offers additional resistance to the tendency of the center of the plate to bend in an upward direction. It becomes readily apparent in Figs. 5 and 6 that the strength of the novel center plate is provided by the disposition of the flanges 20 and 28 and protuberance 22 on the underside of the plate.

Figures 7–11 illustrate another embodiment of the invention wherein the depending straight flanges 40 are tangential to the arcuate flange 42 which is disposed about the periphery of the protuberance 44 on the underside of the plate. In Fig. 7 the center plate is disposed, as usual, between the car body supporting member 10 and the car truck supporting member or bolster 12. The walls of the center sill 14 and 16 are the weight bearing members and the center filler 18 offers reinforcement for the center sill walls.

The center plate has a flat top surface 46 and is formed with a depression 52 concentric about the central aperture 50. A boss 48 is concentric about the central aperture 50 and is entirely within the depression 52 on the top surface. Depending flanges 40 are disposed on opposing edges of the plate and are oriented at right angles to the longitudinal axis of the plate and car body and have a depth greater than protuberance 44 so as to offer maximum resistance to bending forces. Arcuate flange 42 and straight flanges 40 are perpendicular to bottom surface 56. The thickness of that portion of the center plate between top surface 46 and bottom surface 58, which lies between the central protuberance 44 and arcuate flange 42, is thicker than other portions of the center plate to offer greater resistance to bending and fracturing forces.

Rivet holes 54 are so disposed as to conform to the American Association of Railroads' requirements as to location.

There has been disclosed, therefore, a novel center plate providing substantial reinforcement to those areas of the center plate subject to bending and fracturing forces. The strength of the center plate is due to the configuration of a central protuberance and to the straight and arcuate flanges disposed about the protuberance.

The terms and expressions which have been employed are used as terms of description and not of limitation and there is no intention of excluding such equivalents of the invention described or of the portions thereof as fall within the purview of the claims.

What is claimed is:

1. In railway car construction, a car body center plate comprising a flat body portion rectangular in shape and having a central aperture, said body portion having on one side thereof an annular protuberance disposed about said aperture and strengthening means comprising an arcuate flange disposed adjacent the periphery of said protuberance, and a pair of parallel flanges disposed adjacent opposing edges of said plate connected to said arcute flange.

2. In railway car construction, a car body center plate comprising a flat body portion rectangular in shape and having a central aperture, said body portion having on one side thereof an annular protuberance disposed about said aperture with a corresponding depression to said protuberance on the other side thereof, and strengthening means on the same side as said protuberance comprising an arcuate flange disposed adjacent the periphery of said protuberance, and a pair of generally straight flanges disposed adjacent opposing edges of said plate and connected to said arcuate flange.

3. In railway car construction, a car body center plate comprising a flat body portion rectangular in shape and having a central aperture, said body portion having on one side thereof an annular protuberance disposed about said aperture with a corresponding depression to said protuberance on the other side thereof, strengthening means on one side comprising a segmented arcuate flange disposed adjacent the periphery of said protuberance, and a pair of straight flanges disposed adjacent opposing edges of said plate and connected to said segmented arcuate flange.

4. In railway car construction, a car body center plate as herein described in claim 1 wherein the parallel flanges are of a depth greater than that of the annular protuberance.

5. In railway car construction, a car body center plate as described in claim 3 wherein each segment of the segmented arcuate flange is connected to the nearest straight flange by a flange of equal depth to the segmented arcuate flange.

6. In railway car construction, a car body center plate as in claim 1 wherein the parallel flanges adjacent opposing edges of said plate are tangential to said arcuate flange.

References Cited in the file of this patent

UNITED STATES PATENTS 2,833,227    Heater et al.   ----------- May 6, 1958